United States Patent [19]

Yanagisawa et al.

[11] Patent Number: 5,765,355
[45] Date of Patent: Jun. 16, 1998

[54] RUBBER ARTICLE-REINFORCING STEEL CORDS AND PNEUMATIC TIRES USING SUCH STEEL CORDS

[75] Inventors: Manabu Yanagisawa, Kodaira; Kiyoshi Ikehara, Chofu, both of Japan

[73] Assignee: Bridgestone Corportion, Tokyo, Japan

[21] Appl. No.: 708,725

[22] Filed: Sep. 5, 1996

Related U.S. Application Data

[62] Division of Ser. No. 223,130, Apr. 5, 1994, Pat. No. 5,559,693, which is a continuation of Ser. No. 840,082, Feb. 24, 1992, abandoned.

[30] Foreign Application Priority Data

Feb. 25, 1991 [JP] Japan ............................. 3-50292
Nov. 28, 1991 [JP] Japan ............................. 3-314613

[51] Int. Cl.[6] .................................................. D02G 3/36
[52] U.S. Cl. ..................................... 57/212; 57/902
[58] Field of Search ............................ 57/200, 210, 212, 57/213, 215, 902

[56] References Cited

U.S. PATENT DOCUMENTS

| | | | |
|---|---|---|---|
| 4,258,543 | 3/1981 | Canevari | 57/212 |
| 4,385,486 | 5/1983 | Iwata et al. | 57/212 |
| 4,609,024 | 9/1986 | Yatsunami et al. | 57/212 |
| 5,162,067 | 11/1992 | Miyawaki | 57/200 |

FOREIGN PATENT DOCUMENTS

| | | |
|---|---|---|
| 0342644 | 11/1989 | European Pat. Off. . |
| 0399795 | 11/1990 | European Pat. Off. . |
| 0385666 | 9/1992 | European Pat. Off. . |
| 63-166603 | 7/1988 | Japan . |
| 63-235587 | 9/1988 | Japan . |
| 2154086 | 6/1990 | Japan . |

*Primary Examiner*—William Stryjewski
*Attorney, Agent, or Firm*—Sughrue, Mion, Zinn, Macpeak & Seas, PLLC

[57] ABSTRACT

A steel cord is disclosed, which has a core-sheath double layer structure having a 2+7 cord construction or a 2+8 cord construction. A twisting direction of the core is the same as that of the sheath, a forming rate Rc of filaments of the core is 103 to 120%, and a forming rate Rs of filaments of the sheath is 102 to 115%. A pneumatic radial tire using such steel cords in a belt layer is also disclosed.

9 Claims, 3 Drawing Sheets

FIG_1
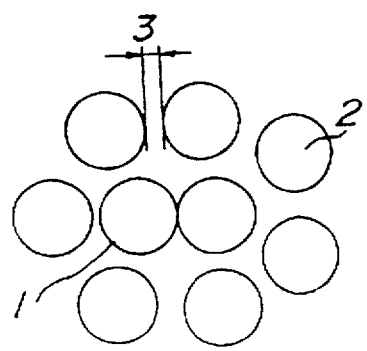
FIG_2
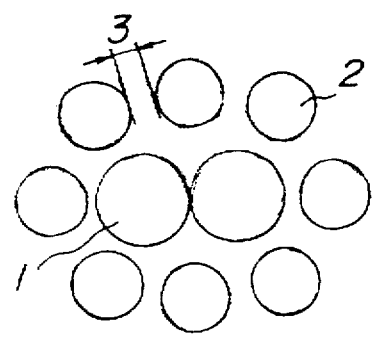

FIG_3a
FIG_3b
FIG_4a
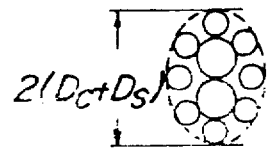
FIG_4b
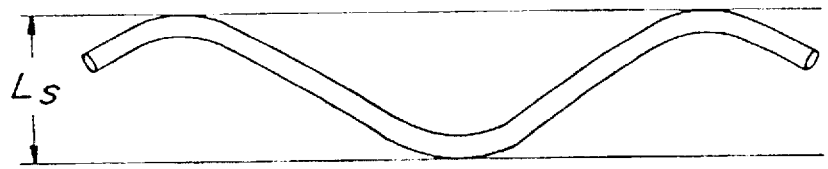

FIG_5 PRIOR ART
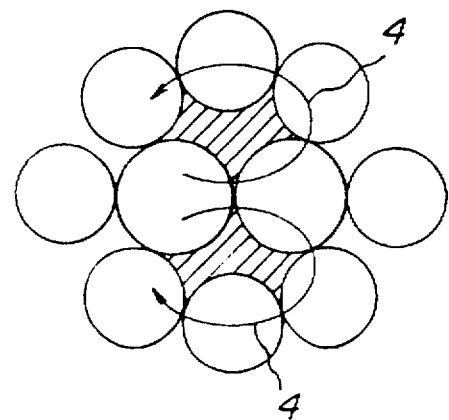
FIG_6
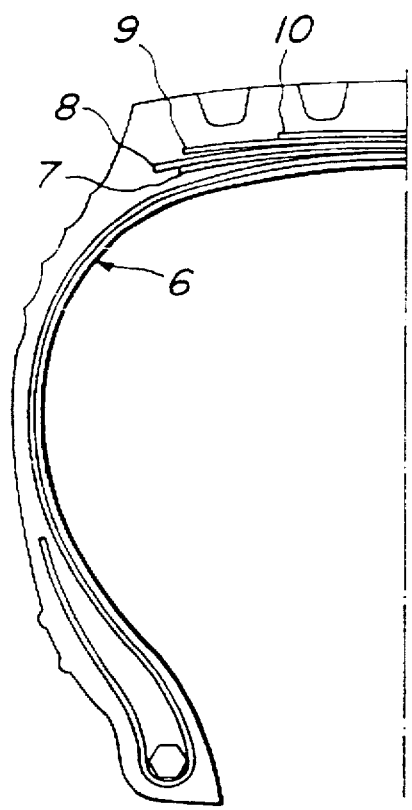

RUBBER ARTICLE-REINFORCING STEEL CORDS AND PNEUMATIC TIRES USING SUCH STEEL CORDS

This is a divisional of application Ser. No. 08/223,130 filed Apr. 5, 1994, now U.S. Pat. No. 5,598,593; which is a file wrapper continuation of Ser. No. 07/840,082 filed Feb. 24, 1992, now abandoned.

BACKGROUND OF THE INVENTION

1. Field of the Invention

The present invention relates to steel cords to be used as a reinforcing material for rubber articles such as pneumatic tires or industrial belts. The invention also relates to pneumatic tires using such steel cords in belt layers.

2. Related Art Statement

In a rubber article reinforced with steel cords, there is a problem in that steel filaments are corroded with water invading the rubber article to lower service life of the product.

For example, if the steel cord used in a belt of a tire has a cavity in it, the following problem will occur. That is, when a tread of the tire undergoes an exterior cut reaching the belt, water invades the belt, and spreads inside the cavity of the cord in a longitudinal direction of the steel cord. Consequently, rust resulting from the invading water spreads so that adhesion between the rubber and steel cord decreases at a rust-spread portion to produce a separation phenomenon.

Under the circumstances, in order to prevent cut separation due to propagation of the corrosion, a cord construction is proposed, in which rubber can fully penetrate into the cord through gaps among adjacent metallic filaments during vulcanization under pressure.

Japanese patent application Laid-open No. 63-235,587 discloses a pneumatic tire provided with a belt layer burying, in rubber, steel cords which have a 2+7 cord construction and a tenacity of 1,700 to $2,050d^{1.872}$ kgf/cord (d (diameter of filament)=0.28 to 0.40 mm).

Bridgestone Corporation formerly disclosed a steel cord having a 2+8 cord construction, in which a diameter of each filament is in a range of 0.30 to 0.42 mm, a difference (Dc–Ds) diameter of filament between a core and a sheath is not less than 0.4 mm, and the twisting direction of the core is the same as that of the sheath, and a pitch ratio Ps/Pc between the core and the sheath is 1.4 to 3.0, as well as pneumatic tires using such cords in a belt layer (Japanese patent application Laid-open No. 2-154,086. In this tire, cut separation of the tire is to be prevented by using rubber-permeable type steel cords in the belt layer.

However, steel cords disclosed in Japanese patent application Laid-open Nos. 63-235,587 and 2-154,086 are not optimized in terms of "forming", so that sheath-sheath gaps great enough to allow rubber to penetrate into the cords by vulcanization under pressure cannot be realized or restraint forces for mutual filaments in the core or sheath become insufficient to cause deviation in twisting filaments of the sheath, which forms a portion where the filaments of the sheath adheres to each other to hinder penetration of rubber into the cord through there (FIG. 5). Because of this, in the case of a pneumatic radial tire using such cords in a belt layer, that portion of the cord into which rubber does not sufficiently penetrate may appear even after vulcanization under pressure. Thus, it is not always guaranteed that cut separation resistance can be stably obtained as one of product performances for the tire.

SUMMARY OF THE INVENTION

It is an object of the present invention to provide steel cords into which a sufficient amount of rubber can stably penetrate by vulcanization under pressure so that when such steel cords are used in a rubbery article, particularly in a pneumatic radial tire, cut separation resistance can be stably obtained as one of product performances. The invention is also aimed at the provision of a pneumatic tire using such steel cords in a belt layer.

That is, the present inventors made a strenuous examination to solve the above-mentioned problems, and discovered that a sufficient amount of rubber can be stably penetrated into the steel cord having a 2+7 or 2+8 cord construction by vulcanizing under pressure through appropriately forming filaments of the core and the sheath of the steel cord. The present invention has been accomplished based on this discovery.

More specifically, the present invention relates to the rubber article-reinforcing steel cord having a core-sheath double layer structure having a 2+7 cord construction or a 2+8 cord construction, in which a twisting direction of the core is the same as that of the sheath, a forming rate Rc of filaments of the core is 103 to 120%, and a forming rate Rs of filaments of the sheath is 102 to 115%. The present invention also relates to the pneumatic radial tire using such steel cords in a belt layer.

These and other objects, features, and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a sectional view of an embodiment of a steel cord having the 2+7 cord construction according to the present invention;

FIG. 2 is a sectional view of another embodiment of a steel cord having the 2+8 cord construction according to the present invention;

FIG. 3a is a sectional view of a core of an embodiment of a steel cord having the 2+8 cord construction;

FIG. 3b is a side view of one filament of this core;

FIG. 4a is a sectional view of a steel cord having a 2+8 cord construction according to the present invention;

FIG. 4b is a side view of a filament of a sheath of this steel cord;

FIG. 5 is a sectional view of the conventional steel cord; and

FIG. 6 is a sectional view of a left half portion of a heavy duty pneumatic radial tire.

DESCRIPTION OF THE PREFERRED EMBODIMENTS

The present invention will be explained in more detail with reference to the attached drawings.

FIGS. 1 and 2 show sections of embodiments of rubber article-reinforcing steel cords according to the present invention. FIG. 1 is a sectional view of a 2+7 cord construction in which a sheath filament has the same diameter as that of a core filament. As shown, seven sheath filaments 2 are arranged around two core filaments. FIG. 2 is a sectional view of a 2+8 cord construction in which a core filament has a diameter greater than that of a sheath filament. As shown, eight sheath filaments are arranged around two core filaments similarly as in FIG. 1.

The forming rate of the core filament is defined as follows:

A theoretical diameter of the core is defined as 2Dc by a maximum sectional width of two core filaments closely arranged as shown in FIG. 3a. After the sheath composed of the steel cords is removed, one core filament 1 is taken out without being permanently deformed. Then, a maximum height Lc (core-formed amount) of the wavy filament as shown in FIG. 3b is measured by using a magnifying glass. The forming rate Rc of the core is defined by the following equation:

$$Rc=(Lc/2Dc) \times 100 (\%)$$

The forming rate of the sheath filament is defined as follows:

A theoretical diameter of the sheath is defined as 2(Dc+Ds) by a maximum sectional width of the sheath and core filaments closely arranged in series as shown in FIG. 4a. One sheath filament of the steel cord is taken out without being permanently deformed. Then, a maximum height Ls (sheath-formed amount) of the wavy filament as shown in FIG. 4b is measured by using a magnifying glass. The forming rate Rs of the sheath is defined by the following equation:

$$Rs=\{Ls/2(Dc+Ds)\} \times 100 (\%)$$

In the present invention, the content of carbon in the steel cord is preferably from 0.80 to 0.85% by weight, when the cord is applied to a belt layer in a heavy duty pneumatic radial tire such as a bus or a truck.

Further, according to the present invention, it is preferable to employ the 2+8 cord construction from the standpoint of increasing specific strength of the steel cord and reducing a weight of a rubbery product.

The reason why the steel cord-twisted construction is limited to the core-sheath double layer structure having the 2+7 or 2+8 two-layer cord construction is that the 2+7 cord construction or the 2+8 cord construction is the most suitable among the 2+n cord constructions as a cord construction which advantageously allows rubber to sufficiently penetrate into gaps between the filaments of the sheath in the steel cord and is advantageous in terms of specific strength and fatigue resistance.

That is, if the twisted construction is a cord construction of 2+6 or less, sufficient gaps can be ensured to penetrate rubber into the cord. However, in order to obtain the same cord tenacity as that of the 2+7 or 2+8 cord construction, it is necessary to increase the diameter of the filaments as compared with the 2+8 cord construction. This deteriorates specific strength and fatigue resistance. On the other hand, if the twisted struction is the 2+9 cord construction, filaments are likely to adhere to one another due to a greater number of the sheath filaments, even when the cord is formed. Consequently, rubber cannot be sufficiently penetrated into the cord.

Further, according to the present invention, it is necessary to twist the filaments in the core in the same direction as that in the sheath. The reason is that if the twisting direction differs between the filaments in the core and those in the sheath, the contact pressure among the filaments becomes greater as compared with the twisting in the same direction. Accordingly, fretting is likely to occur, fatigue resistance greatly drops, and tenacity-maintaining percentage is also lowered.

Further, the reason why the forming rates of the filaments of the sheath and the core in the steel cord are limited as mentioned above is as follows:

If the forming rate of the filaments of the sheath is less than 102%, the gaps between the adjacent filaments of the sheath are so narrow that it is likely that a portion is formed where a sufficient rubber does not penetrate into the the cord. On the other hand, if the forming rate of the filaments is more than 115%, the gaps between adjacent filaments in the sheath are so great that the sheath filaments closely adhere to one another without being restrained by the core. Consequently, a portion where no rubber penetrates (as illustrated by a shadowed portion in FIG. 5) is likely to be formed.

On the other hand, if the forming rate of the core filament is less than 103%, the sheath cannot be sufficiently restrained. Consequently, as shown in FIG. 5, there is the possibility that an annular closed space into which no rubber penetrates is formed. On the other hand, if the forming rate of the core filaments is more than 120%, problems such as bending deformation of the cords are likely to occur in the production of the cord.

The forming rate Rc of the filaments in the core is preferably 103 to 115%, and the forming rate of the filaments of the sheath is preferably 102 to 108%.

In order to attain greater mutual restraint forces for the sheath and the core, the forming rate Rc of the filaments of the core and the forming rate Rs of the filaments of the sheath more preferably satisfies the relationship: Rc≧Rs. Further, it is the most preferable that Rc>Rs.

Further, it is preferable that the diameter Dc of the filament of the core and the diameter Ds of the filament of the sheath fall within a range of 0.26 to 0.42 mm. More preferably, Dc=Ds in the case of the 2+7 cord construction, and Dc−Ds≧0.06 mm for the 2+8 cord construction.

It is preferred that the diameter of the filament is 0.40 mm and 0.34 mm for the core and the sheath, respectively, that the pitch of the filament is Pc=5 to 14 mm and Ps=12 to 30 mm for the core and the sheath, respectively, and that the ratio Ps/Pc between the core and the sheath is in a range of 1.8 to 2.2.

The steel cords according to the present invention can be favorably used for the belt layer of the pneumatic radial tire.

Next, the present invention will be explained in more detail with reference to specific embodiments.

Heavy duty pneumatic radial tires 6 having a size of 1000 R 20 as shown in FIG. 6 were used as rubber articles for evaluating steel cords. The tire possessed four belt plies 7 through 10, and test steel cords were used in second and third belt plies 8 and 9. The cord-arrayed angle was 20° toward the right side and 20° toward the left side from the circumferential direction for the second and third belt plies, respectively. The number of the cords per 5 cm was 18.6 for both the second and third belt plies.

The forming rate and the corrosion-propagating resistance of the steel cord, and cut separation resistance of the tire were determined or evaluated.

Forming Rate of the Steel Cord

A rubberized steel cord taken out from the belt layer of a tire was immersed into nitrobenzen, which was boiled for 2 to 3 hours to completely peel off rubber. Then, the forming ratio was determined according to the above-mentioned definition. At that time, opposite ends of the steel cord were bent before removing the rubber to prevent unwinding of the cord, and the measurement was effected at a location of the cord upon which the bending posed no influence.

Corrosion-propagating Resistance

Corrosion-propagating resistance was examined according to a cut end corrosion (CEC) test method. That is, a surface of a rubberized steel cord taken out from a belt ply of a tire was coated with a silicon sealant, and after drying, opposite ends of the cord were cut off to give a sample having a length of about 10 cm. After one end of the cord sample was immersed into a 10% aqueous solution of sodium hydroxide for 24 hours, the cord was taken out from the solution, and a length by which the rubber peeled off was measured from the end of the cord. Totally ten to thirty cords (N=10 to 30) were tested, and their variations and absolute levels thereof were evaluated for comparison by using a width between a minimum value and a maximum value and a central value median.

Cut Separation Resistance

Cut separation resistance was evaluated according to a corrosion-propagating drum test method. That is, holes were formed by a drill at three locations in each of twelve kinds of tires prepared by trial to reach a second or third belt ply counted from an inner surface of the tire, and water was sealingly charged into a tire tube. Then, the tire was assembled onto a rim. Then, the tire was run on a drum over 20.000 km, the tire was decomposed. Cut separation resistance was evaluated by a maximum peeled length of an adhesive due to corrosion of the cord.

Specification of the cords and evaluation results are shown in Tables 1 and 2.

TABLE 1

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Specification of cord | Cord construction | | 2 + 6 | 2 + 7 | 2 + 7 | 2 + 8 | 2 + 8 | 2 + 8 | 2 + 8 | 2 + 9 |
| | Filament diameter (mm) | Core | 0.23 | 0.37 | 0.37 | 0.40 | 0.40 | 0.40 | 0.40 | 0.44 |
| | | Sheath | 0.23 | 0.37 | 0.37 | 0.34 | 0.34 | 0.34 | 0.34 | 0.30 |
| | Twisting pitch (mm) | Core | 6 | 8 | 8 | 8 | 8 | 8 | 8 | 8 |
| | | Sheath | 12 | 16 | 16 | 16 | 16 | 16 | 16 | 16 |
| | Twisting direction | Core | S | S | S | S | S | S | Z | S |
| | | Sheath | S | S | S | S | S | S | S | S |
| | Forming rate (%) | Core | 100 | 104 | 100 | 100 | 100 | 100 | 105 | 105 |
| | | Sheath | 100 | 100 | 106 | 93 | 105 | 114 | 105 | 105 |
| | Carbon content (%) | | 0.82 | 0.82 | 0.82 | 0.82 | 0.82 | 0.82 | 0.82 | 0.82 |
| Evaluation results | Resistance to corrosion propagation (CEC method) median (minimum–maximum (mm)) | | 40 (10–70) | 40 (10–70) | 35 (10–60) | 55 (10–100) | 45 (5–85) | 57.5 (15–100) | 100 (all 100) | 80 (60–100) |
| | Cut separation resistance (peeled length of adhesive (mm)) | | 60 | 60 | 50 | 200 | 70 | 90 | 400 | 300 |

TABLE 2

| | | | Example 1 | Example 2 | Example 3 | Example 4 | Example 5 | Example 6 |
|---|---|---|---|---|---|---|---|---|
| Specification of cord | Cord construction | | 2 + 7 | 2 + 8 | 2 + 8 | 2 + 8 | 2 + 8 | 2 + 8 |
| | Filament diameter (mm) | Core | 0.37 | 0.40 | 0.40 | 0.40 | 0.40 | 0.40 |
| | | Sheath | 0.37 | 0.34 | 0.34 | 0.34 | 0.34 | 0.34 |
| | Twisting pitch (mm) | Core | 8 | 8 | 8 | 8 | 8 | 8 |
| | | Sheath | 16 | 16 | 16 | 16 | 16 | 16 |
| | Twisting direction | Core | S | S | S | S | S | S |
| | | Sheath | S | S | S | S | S | S |
| | Forming rate (%) | Core | 112 | 106 | 112 | 104 | 108 | 107 |
| | | Sheath | 105 | 104 | 105 | 106 | 107 | 110 |
| | Carbon content (%) | | 0.82 | 0.82 | 0.82 | 0.82 | 0.82 | 0.82 |
| Evaluation results | Resistance to corrosion propagation (CEC method) median (minimum–maximum (mm)) | | 18 (6–30) | 10 (5–15) | 12.5 (5–20) | 17.5 (10–25) | 20 (5–35) | 20 (10–30) |
| | Cut separation resistance (peeled length of adhesive (mm)) | | 16 | 10 | 15 | 30 | 18 | 35 |

As is shown from the evaluation results shown in Tables 1 and 2, according to the rubber article-reinforcing steel cord according to the present invention, since the filaments of the core and those of the sheath in the 2+7 cord construction or the 2+8 cord construction are appropriately formed, the weight of a composite body in which the steel cords are combined with rubber in a rubberized cloth shape can be suppressed can be suppressed, and stable corrosion-propagating resistance can be obtained, when tenacity of the cords are made uniform.

Furthermore, when the above steel cords are used in the belt layer of the heavy duty pneumatic radial tire, sufficient internal pressure-maintaining property can be ensured and stable cut separation resistance can be obtained, even when the steel cords are used in the inner belt layer of the heavy duty pneumatic radial tire. Such effects are extremely great in the case of the 2+8 cord construction.

What is claimed is:

1. A steel cord having a core-sheath double layer structure having a 2+8 cord construction, in which a twisting direction of the core is the same as that of the sheath, a forming rate Rc of filaments of the core is 103 to 120%, and a forming rate Rs of filaments of the sheath is 102 to 115%.

2. The steel cord according to claim 1, wherein a content of carbon in the steel cord is from 0.80 to 0.85% by weight.

3. The steel cord according to claim 1, wherein the forming rate Rc of the filaments in the core is 103 to 115%.

4. The steel cord according to claim 1, wherein the forming rate of the filaments of the sheath is 102 to 108%.

5. The steel cord according to claim 1, wherein the forming rate Rc of the filaments of the core and the forming rate Rs of the filaments of the sheath satisfies the relationship: $Rc \geq Rs$.

6. The steel cord according to claim 5, wherein $Rc > Rs$.

7. The steel cord according to claim 1, wherein the diameter Dc of the filament of the core and the diameter Ds of the filament of the sheath fall within a range of 0.26 to 0.42 mm.

8. The steel cord according to claim 1, wherein $Dc-Ds \geq 0.06$ mm, wherein Dc is the diameter of the filament of the core and Ds is the diameter of the filament of the sheath.

9. The steel cord according to claim 1, wherein a diameter of the filament is 0.40 mm and 0.34 mm for the core and the sheath, respectively, a pitch of the filament is Pc=5 to 14 mm and Ps=12 to 30 mm for the core and the sheath, respectively, and a ratio Pc/Ps between the core and the sheath is in a range of 1.8 to 2.2.

* * * * *

UNITED STATES PATENT AND TRADEMARK OFFICE
CERTIFICATE OF CORRECTION

PATENT NO.   : 5,765,355
DATED        : June 16, 1998
INVENTOR(S)  : M. Yanagisawa et al.

It is certified that error appears in the above-identified patent and that said Letters Patent is hereby corrected as shown below:

Column 1,
Line 6, the correct parent patent number should read -- 5,598,693 --.

Signed and Sealed this

Twenty-fourth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 5,765,355
DATED : June 16, 1998
INVENTOR(S) : Manabu Yanagisawa and Kiyoshi Ikehara It is certified that error appears in the above-identified patent and that said Letters Patent is hereby corrected as shown below:

Title page,
Item [62], should read:
-- Division of Ser. No. 223,130, Apr. 5, 1994, Pat. No. 5,598,693 which is a continuation of Ser. No. 840,082, Feb. 24, 1992, abandoned. --

Signed and Sealed this

Fifteenth Day of April, 2003

JAMES E. ROGAN
*Director of the United States Patent and Trademark Office*